Figure 11:
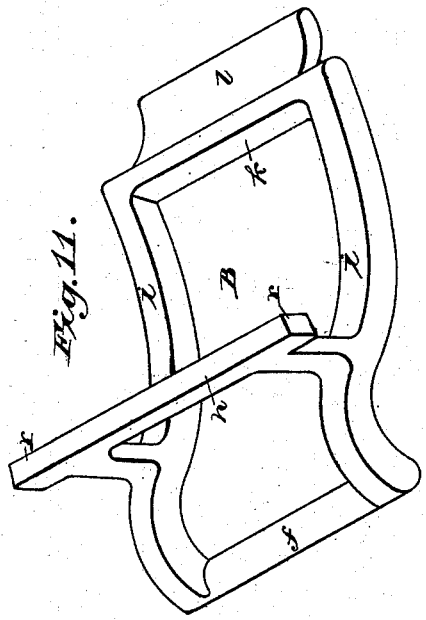

(No Model.)  5 Sheets—Sheet 1.
R. PORTER.
BUCKLE.
No. 283,278. Patented Aug. 14, 1883.
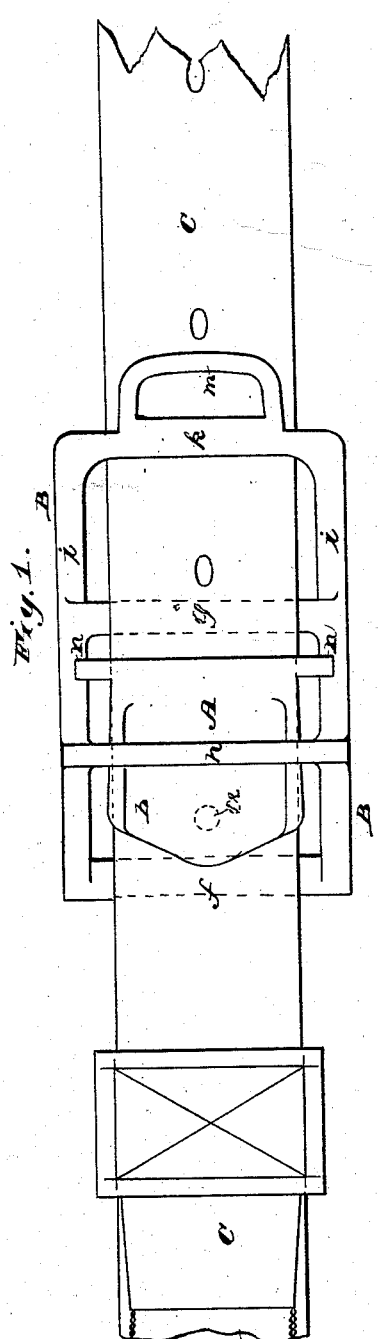
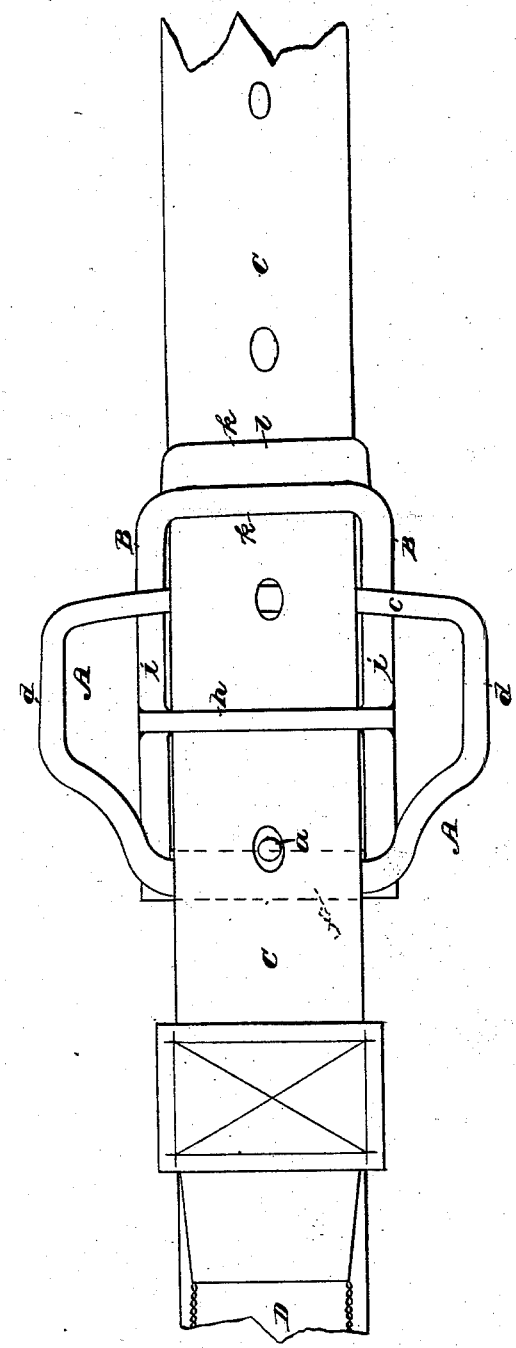
Witnesses
Wm. J. Danner
C. J. Heduck
Inventor
Robert Porter by
A. Pollok
his attorney

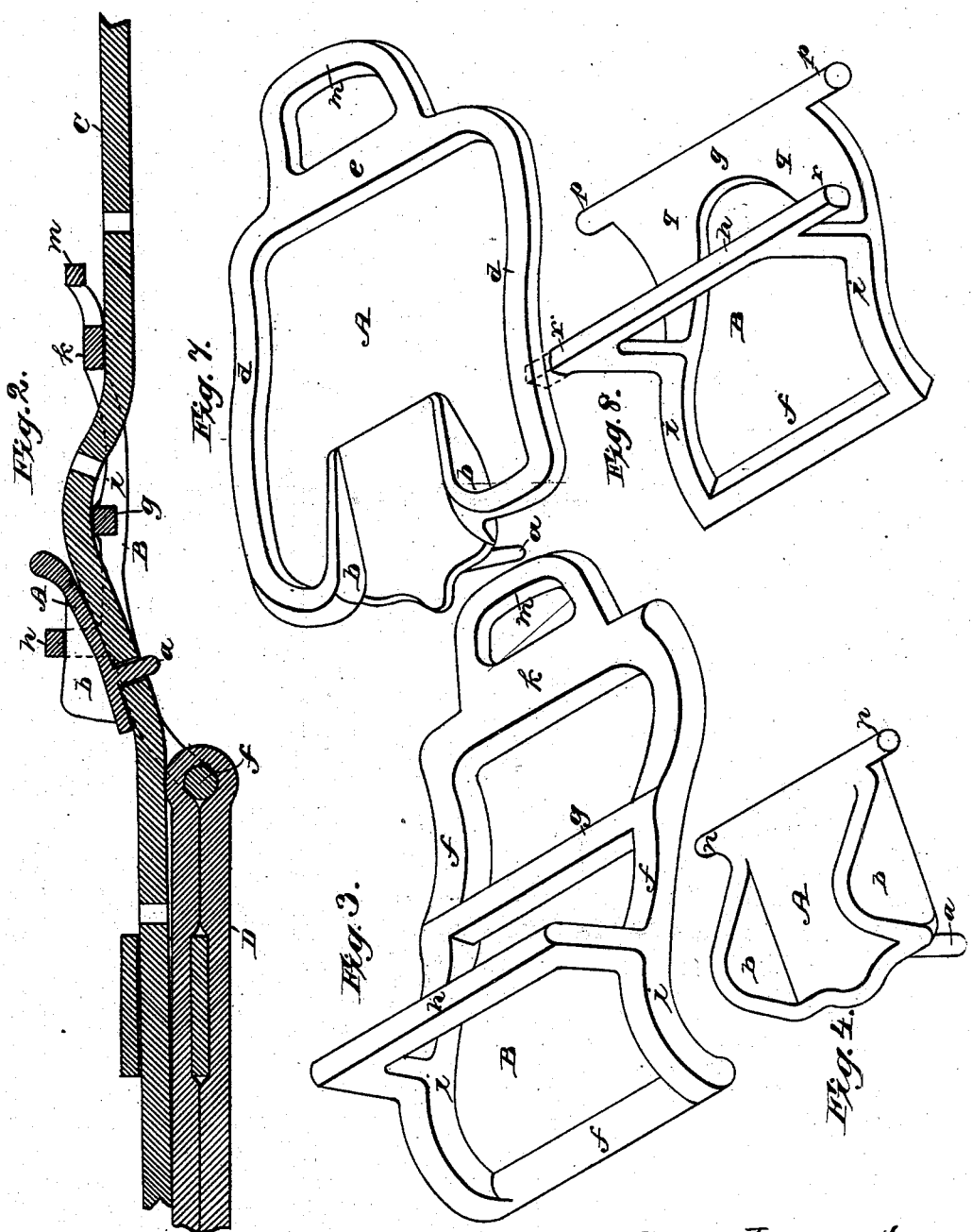

(No Model.) R. PORTER. 5 Sheets—Sheet 3.
BUCKLE.
No. 283,278. Patented Aug. 14, 1883.
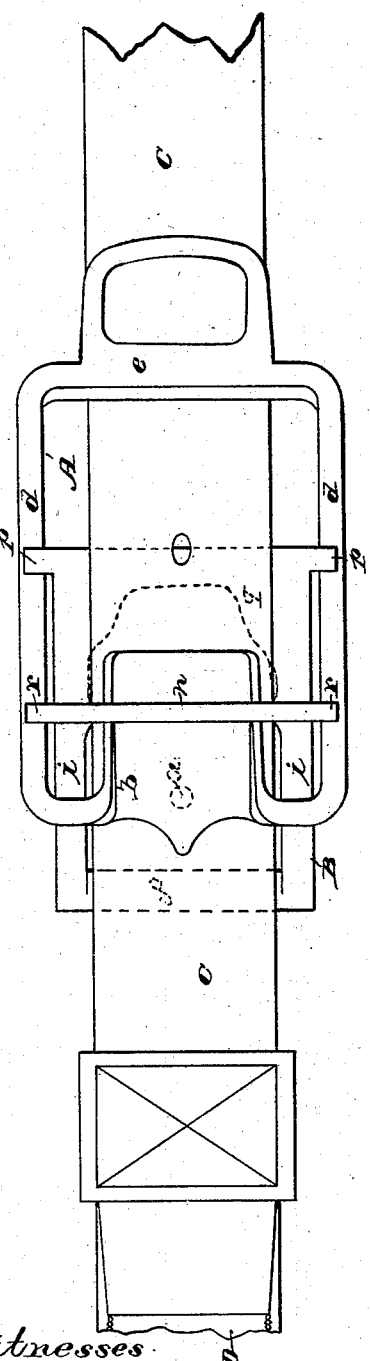
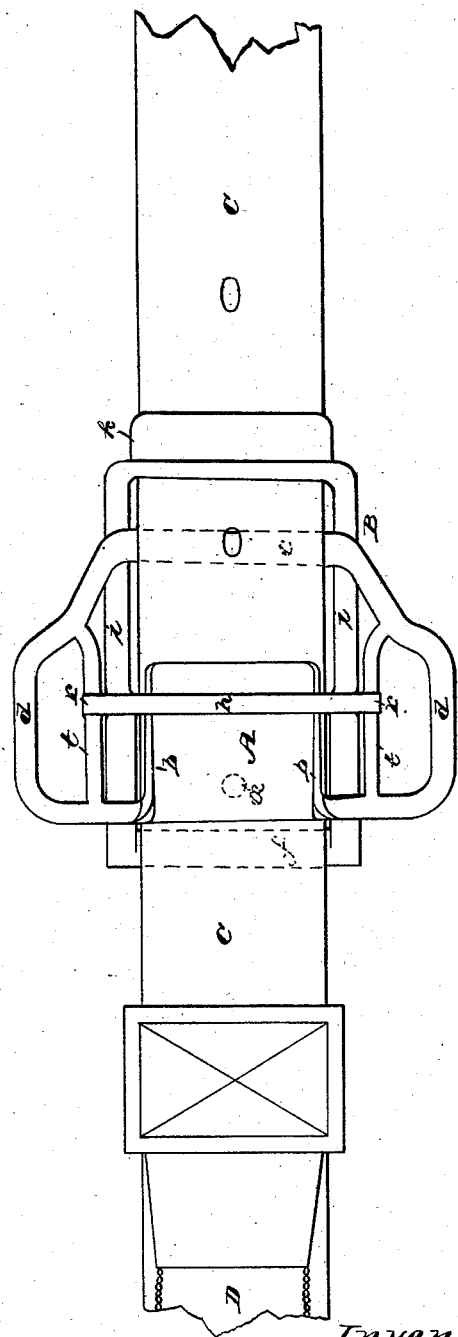
Witnesses
Wm. J. Danner
C. J. Hedrick
Inventor
Robert Porter by
A. Pollok
his attorney.

(No Model.) 5 Sheets—Sheet 4.
R. PORTER.
BUCKLE.
No. 283,278. Patented Aug. 14, 1883.
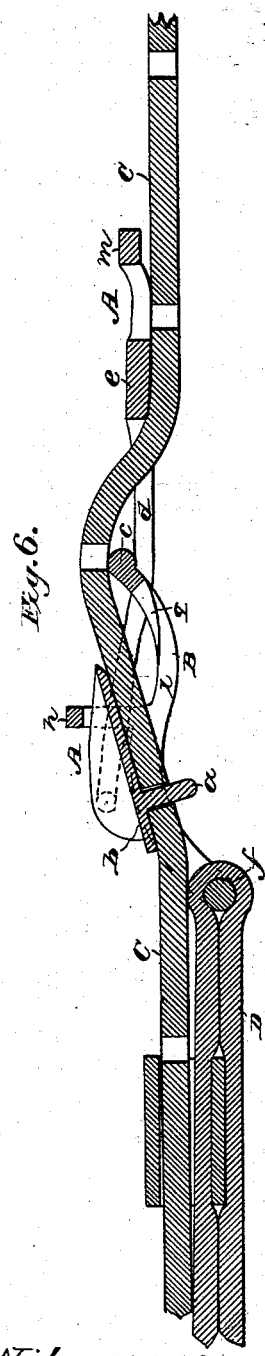
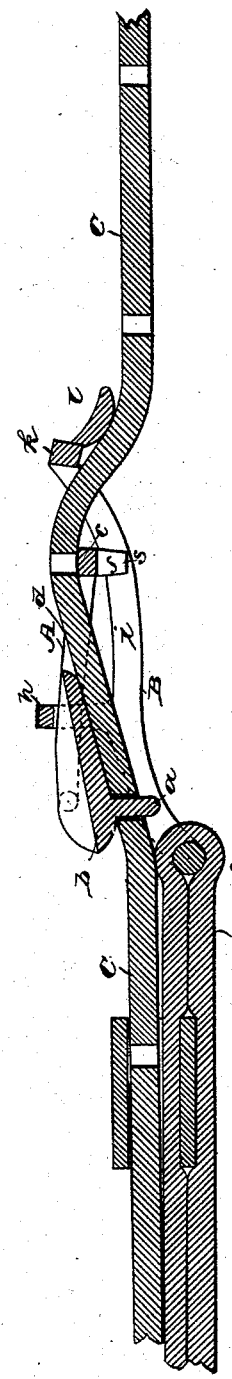
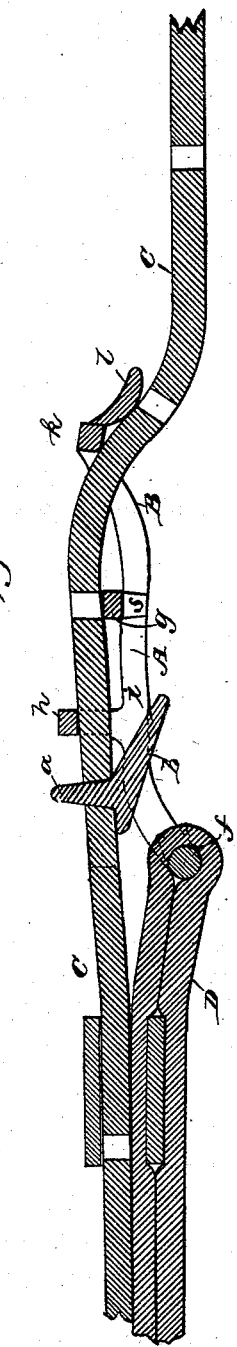
Witnesses
Wm. J. Janney
C. J. Hedrick
Inventor
Robert Porter by
A. Pollok
his attorney.

(No Model.)  5 Sheets—Sheet 5.

R. PORTER.
BUCKLE.

No. 283,278. Patented Aug. 14, 1883.

Witnesses
Wm J Tanney
C. J. Hedrick

Inventor
Robert Porter
by A. Pollok
his attorney

N. PETERS. Photo-Lithographer, Washington, D. C.

UNITED STATES PATENT OFFICE.

ROBERT PORTER, OF OTTUMWA, IOWA.

BUCKLE.

SPECIFICATION forming part of Letters Patent No. 283,278, dated August 14, 1883.

Application filed January 30, 1883. (No model.)

*To all whom it may concern:*

Be it known that I, ROBERT PORTER, of Ottumwa, in the county of Wapello and State of Iowa, have invented a new and useful Improvement in Harness and other Buckles, which improvement is fully set forth in the following specification.

This invention, although applicable to other buckles, has reference more particularly to harness-buckles for connecting the traces with the hame-tugs in harness for horses, the said buckles comprising two pieces or frames, one connected with the hame-tug and the other with the trace.

The first part of the invention consists in combining with three cross-bars, all on the same frame, or partly on one and partly on the other frame, a wedge arranged to work under the middle cross-bar, between it and the trace, so that the said wedge presses the trace into the open space between the other cross-bars, bending it more or less as the wedge is drawn a greater or less distance under the said middle cross-bar. Heretofore buckles with wedges working under a cross-bar have been used; but so far as I am aware the space below said cross-bar has been filled, so that the trace is clamped between the wedge and the inside piece, instead of being bent around the wedge and pressed against the cross-bars at either end of the wedge.

The second part of the invention consists in so constructing and combining the two frames or pieces that the trace will be held at two points by two distinct but connected devices, or rather by two sets of such devices. One of the frames—say that which is connected with the trace by a tongue—has two clamping or binding devices, which, when the frames are drawn in opposite directions, clamp the trace against some portion of the frame attached to the hame-tug, or bend the trace outward and inward between cross-bars, so as to bind the same, or both clamp and bind it. Heretofore buckles have been made with one set only of clamping or binding devices, which therefore hold the trace at but one point. By providing two sets of clamping or binding devices, so as to hold the trace at two points, the power of resistance is doubled without a corresponding increase in the weight, size, or expense of the buckle. This second part of the invention further comprises the use of a wedge as one of the clamping or binding devices, and of a cross-bar as the other, and also the use of curved or disked side bars as supports to said cross-bar, so that the latter, like the wedge, will clamp or bind the trace the more firmly as the strain thereupon is greater.

The third part of the invention consists in making the two binding or clamping devices part of the frame which engages the trace by a tongue, and in providing said frame with side loops for the back and belly bands.

The fourth part of the invention consists in providing the buckle, at the rear end thereof, with an inwardly-projecting lip or flange, so that the trace will be pressed in farther than would otherwise be the case.

The invention further comprises certain particular constructions and combinations of parts, as hereinafter set forth.

The accompanying drawings represent buckles constructed in accordance with the invention.

Figure 15:
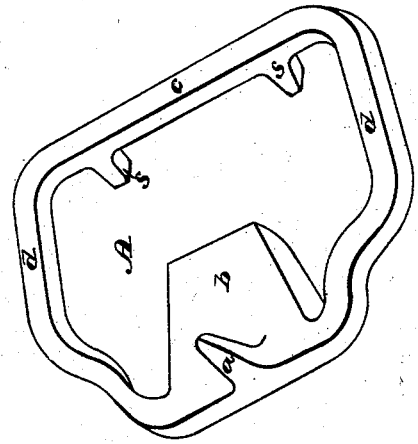

Figures 1 and 2 are respectively an elevation and a section of one of said buckles with the trace or hame-tug in place. Figs. 3 and 4 are perspective views of its parts separated. Figs. 5 and 6 are elevation and section, respectively, of another of said buckles, and Figs. 7 and 8 perspective views of its parts separated. Figs. 9 and 10 are an elevation and section, respectively, of a third buckle, and Figs. 11 and 12 perspective views of its parts. Figs. 13 and 14 are elevation and section, respectively, of a fourth buckle, and Fig. 15 a perspective view of one of its parts.

A B are the two parts or frames of the buckle; C, the trace, and D the hame-tug.

Referring to Figs. 1, 2, 3, 4, and 5, the part B, which is attached to the hame-tug and forms the main frame of the buckle, is composed of the side bars, $i$, the cross-bars $f\ h\ g\ k$, and the breeching-loop $m$. The side bars $i$ are curved inward at the front end to give room for the hame-tug, which is attached to the front cross-bar, $f$. The part A comprises a wedge, $b$, and a tongue, $a$. The wedge $b$ is, for the sake of lightness, made with raised flanges at the side, instead of solid throughout, and works beneath the cross-bar $h$, which is raised above the other cross-bars and attached to the side bars by uprights. It has lugs n, to prevent its being accidentally drawn forward beyond the raised cross-bar. The trace C is passed under the breeching-loop m and cross-bar k, over the cross-bar g, under the wedge b and cross-bar h, and over the cross-bar f, to which the hame-tug is attached. The tongue a is passed through one of the holes in the trace. When the strain is applied to the trace and hame-tug, the parts A B are drawn in opposite directions. The wedge b, being drawn under the cross-bar h, presses the trace into the open space between the cross-bars f g, (see Fig. 2,) and the farther it is drawn under said bar the more it bends the trace, and therefore the more firmly it binds it. The cross-bar k holds down the trace beyond the cross-bar g, and being in, or about in, the plane of the said bar g, bends it around the same and causes it to bind thereon.

Instead of having the cross-bar k or the frame B, the part A may have a cross-bar, e, (shown in Figs. 5, 6, and 7,) the same being connected by the side bars d with the wedge b, and serving substantially the same purpose as the bar k. It has also an additional function, stated below. The cross-bar g has lugs p, Figs. 5 and 8, which rest and slide upon the side bars d of the part A. As in the buckle shown in Figs. 1, 2, 3, 4, the wedge b, engaged with the trace by the tongue a, works under the raised cross-bar h and bends the trace into the space between the cross-bars f g. In Figs. 5 to 8 there are, however, some additional improvements. The side bars d are curved or dished (see Figs. 6 and 7) so that as the cross-bar g approaches the wedge b it is pressed outward, and therefore bends the trace more sharply and holds it more firmly. The cross-bar g is also provided on the inner or front side with curved flanges q, the curvature corresponding more or less exactly with that of the front of wedge a, or of the trace C, when bent around the said wedge. The said flanges, since they slope inward, do not interfere with the bending of the trace into the space between the cross-bars f g. They clamp the bent trace between themselves and the front part of the wedge. They can be applied to the cross-bar g of the buckle shown in Figs. 1 to 4, and they can be omitted from that represented in Figs. 5 to 8. In this latter buckle the cross-bar g itself clamps the trace against the front of the wedge b, the side bars d retaining the wedge b in position and preventing its rocking, as the wedge shown in Figs. 1 to 4 may do.

The side bars d may be connected with the thin end of the wedge, but are preferably connected with it at or near the thick end, as shown, such connection giving better facilities for inserting the trace or strap C.

The raised cross-bar h has at its ends lugs r, which project over the side bars d, and prevent its flying up when the wedge b is entirely withdrawn from under the cross-bar h. Should, therefore, the strain on the trace be relieved at any time, and the part or frame A be accidentally moved forward, so that the wedge is altogether in front of the cross-bar h, the lugs r will hold down the wedge, so that when the strain is reapplied the wedge will be sure to run under the cross-bar h, and not be liable to pass above it.

In the buckle shown in Figs. 9, 10, 11, 12 the wedge b, which works under the cross-bar h, between it and the trace, as heretofore, is connected by side bars d with cross-bar c, which serves as an additional binding or clamping device. It rests upon the side bars of the frame B. Lugs s on the under side of the bar c fit between the side bars and prevent side movement. The trace C is passed over said cross-bar c, between the cross-bar k of the frame B and the wedge b. Then the wedge is drawn under the cross-bar h by the trace C, the cross-bar c is brought nearer the cross-bar k, making the trace bend more sharply over it. The trace is thus held at separate points by the wedge b and cross-bar c, respectively. In order to bind the trace more firmly the side bars i are curved, so as to press outward the cross-bar c as it approaches the bar k. In the frame B of this figure the cross-bar g of Fig. 1 is omitted and the wedge b presses the trace into the space between the cross-bars f and c. The bar c therefore has the double function of binding or clamping the trace at the rear end of the buckle and of co-operating with the wedge to bind it in the middle. The frame B in these figures, 9 to 11, could be provided with an additional cross-bar, like g, Figs. 1 to 3, and the said cross-bar, when used, may be provided with curved flanges, as shown at q, Figs. 5 to 7. The wedge being held down by the cross-bar c and side bars d, the trace would then be clamped against the front of the wedge, as in the buckle shown in Figs. 5 to 8.

Figure 12:
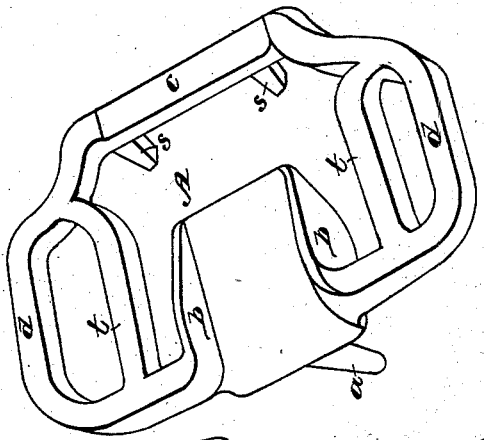

The frame A, Figs. 9, 10, 12, could be used in connection with the frame B. (Shown in Figs. 1 to 3.) The trace C would overlie both the cross-bars c and g.

In Figs. 9 to 11 the frame B is provided at its rear end with an inwardly-projecting flange or lip, l, the object of which is to give to the trace a sharper bend around it and around the cross-bar in front of it. This lip or flange may be applied to the cross-bar k of frame B in Figs. 1 to 3, and to cross-bar e of frame A in Figs. 5 to 7, if desired.

The side bars d, Figs. 9 to 12, are bent outward, so as to leave room to receive the billets of back and belly bands, thus forming side loops. Additional side bars, t, are used, and the cross-bar h has lugs at the ends, which, as they perform the function of the lugs r, Figs. 5 and 7, are similarly lettered.

The side bars d could be omitted if a buckle without side loops is desired, and the side bars t could be omitted; but in that case the frame A would be more liable to accidental displacement. In the buckle shown in Figs. 13, 14, 15 the frame B is the same as that shown in Figs. 9 to 12, except that the lugs r are omitted.

The frame A differs from the frame A shown therein, in having the wedge $b$ reversed, the tongue $a$ being on the top of the wedge. The trace C is passed over the wedge $b$, between it and the raised cross-bar $h$, and is clamped against said bar when strain is applied to the trace. The side bars $t$ are also omitted. It is obvious, however, that these side bars $t$ could be used, as also the lugs $r$, on the cross-bar $h$.

If side loops are desired on the buckle shown in Figs. 1 to 4, they may be placed on the frame B; if desired on the buckle shown in Figs. 5 to 8, they may be placed either on frame A or on frame B, being connected with the lugs on the bars $g$ $h$, or with one pair of said lugs, and the front end of the frame.

The buckles described were, all and every, invented by me, and are included in the present invention.

Modifications other than those indicated may be made without departing from the spirit of the invention, and parts thereof could be used without the others.

It may be observed that the present invention comprises the new improvements common to the several forms of buckles, and in addition the specific minor improvements embodied in the buckle shown in Figs. 9 to 12, the improvements embodied in other buckles, and not shown in said figures, being reserved for separate application.

Having now described my said invention and the manner of carrying the same into effect, what I claim is—

1. In a buckle, a wedge making part of one frame or portion of the buckle, in combination with three cross-bars supported by the side bars of another frame or portion of the buckle, the latter being provided with a vacant space below the intermediate cross-bar, and the aforesaid wedge working under the said intermediate cross-bar and serving to press the trace or strap into the said space, substantially as described.

2. A buckle composed of a wedge provided with a tongue, in combination with a frame provided with side bars and three or more cross-bars, and having the space under the cross-bar, with which the wedge more directly co-operates, entirely free or open, substantially as described.

3. The combination, with a buckle-frame having three or more cross-bars and connecting side bars, of a co-operating part or frame comprising side bars, a cross-bar, and a wedge fixed between the side bars, substantially as described.

4. The combination, with a buckle-frame comprising side bars and cross-bars, of a co-operating part or frame comprising a wedge working under a cross-bar on the frame, side bars fixed thereto, a cross-bar and lugs on the under side of said cross-bar, substantially as described.

5. In a two-part buckle having a wedge fastened between side bars and working under a cross-bar attached to another set of side bars, and in combination with the said elements, the lugs on the ends of said cross-bar, the same projecting over the side bars attached to the wedge and serving to hold it down, substantially as described.

6. In a two-part buckle of the character described, the frame provided at one end with an inwardly-projecting lip or flange, so that a large bend is thereby made in the trace or strap at that point, substantially as described.

In testimony whereof I have signed this specification in the presence of two subscribing witnesses.

ROBERT PORTER.

Witnesses:
A. POLLOK,
PHILIP MAURO.